United States Patent
Hampton

(10) Patent No.: US 6,505,887 B2
(45) Date of Patent: Jan. 14, 2003

(54) INFANT'S RESTRAINING SEAT

(76) Inventor: Lewis E. Hampton, Box 110, Rich Hollow Rd., Erwin, TN (US) 37650

(*) Notice: Subject to any disclaimer, the term of this patent is extended or adjusted under 35 U.S.C. 154(b) by 23 days.

(21) Appl. No.: 09/725,549

(22) Filed: Nov. 29, 2000

(65) Prior Publication Data

US 2002/0053823 A1 May 9, 2002

Related U.S. Application Data

(63) Continuation-in-part of application No. 09/437,024, filed on Nov. 9, 1999, now Pat. No. 6,158,807.

(51) Int. Cl.$^7$ .................................................. A47C 1/08
(52) U.S. Cl. .............................. 297/256.1; 297/256.12; 297/256.16; 297/250.1
(58) Field of Search .................... 297/256.12, 250.1, 297/256.16, 256.1, 344.24, 344.22, 254; 296/65.01, 65.06, 65.11

(56) References Cited

U.S. PATENT DOCUMENTS 6,024,398 A * 2/2000 Horton et al.
6,241,314 B1 * 6/2001 Pufall

* cited by examiner

Primary Examiner—Milton Nelson, Jr.

(57) ABSTRACT

A unique construction for a base of an infant's restraining cushioned seat providing a slide for supporting the cushioned seat, a laterally pivotal guide for the slide, a lateral pivot position and longitudinal slide position locking device for the guide, whereby the slide and cushioned seat attached thereto can be moved to a rearward position adjacent the back of a vehicle seat and locked into position thereon, wherein the locking device can be released and the slide moved to a forward position on the vehicle seat, and whereby thru pivoting of the guide the cushioned seat can be aligned with and positioned adjacent a door opening of the vehicle for providing easy and safe access to the cushioned seat by a person standing substantially outside the vehicle.

20 Claims, 7 Drawing Sheets

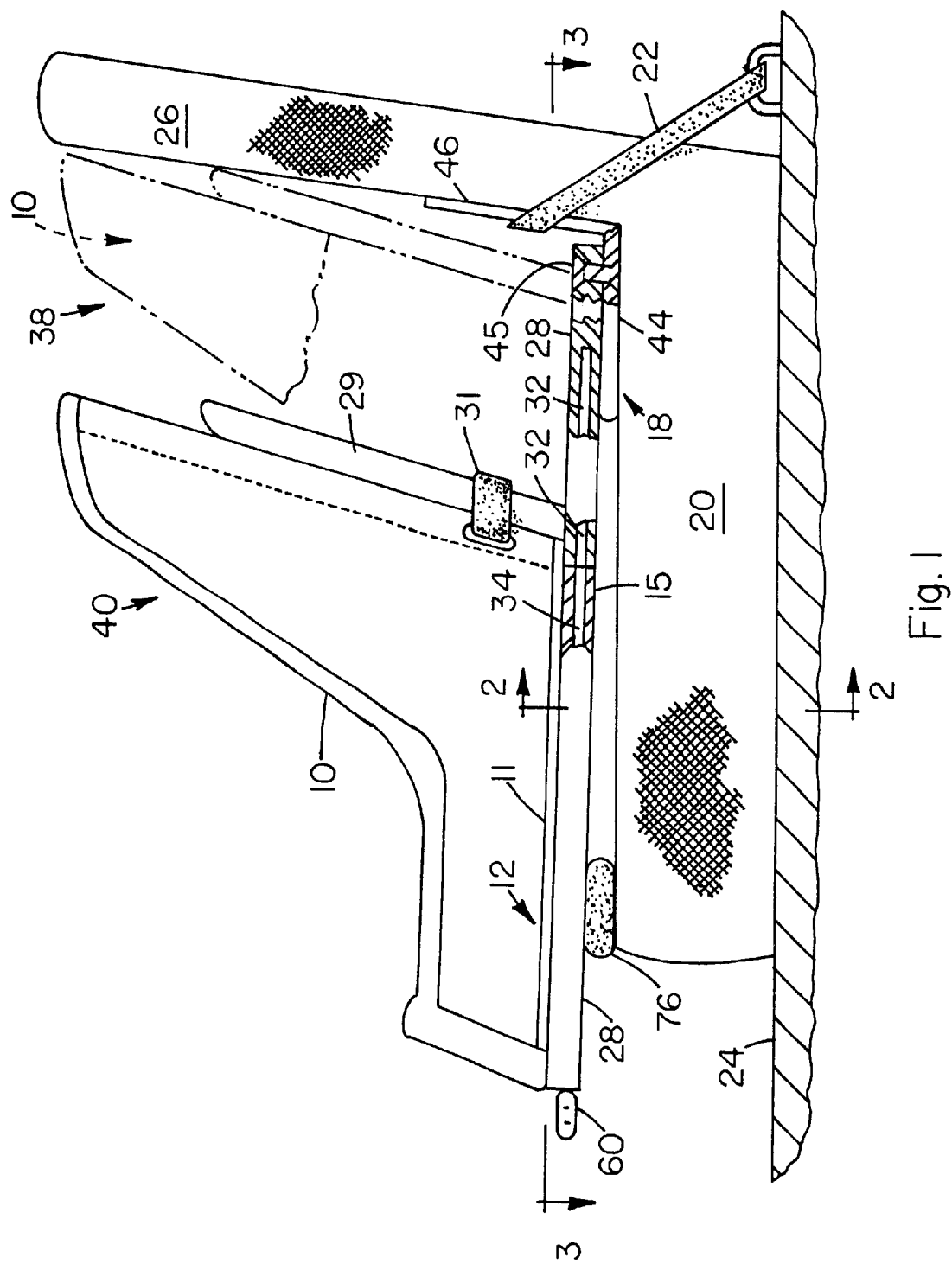

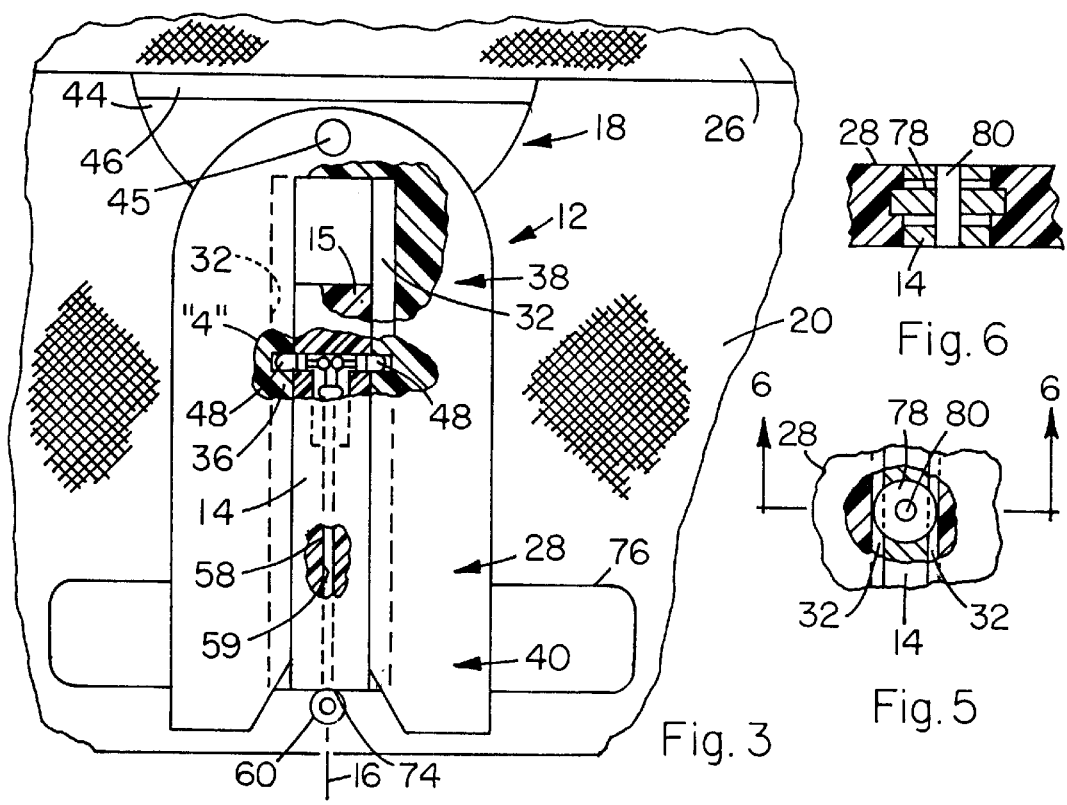
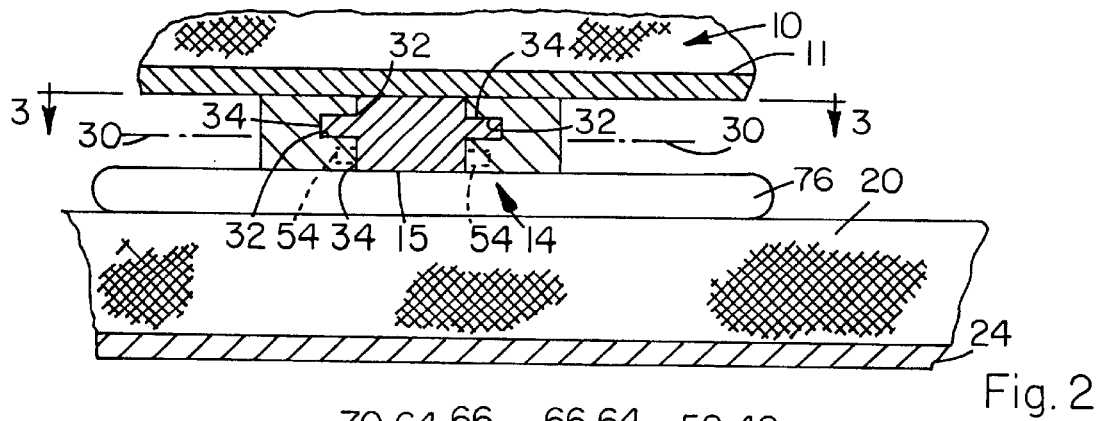
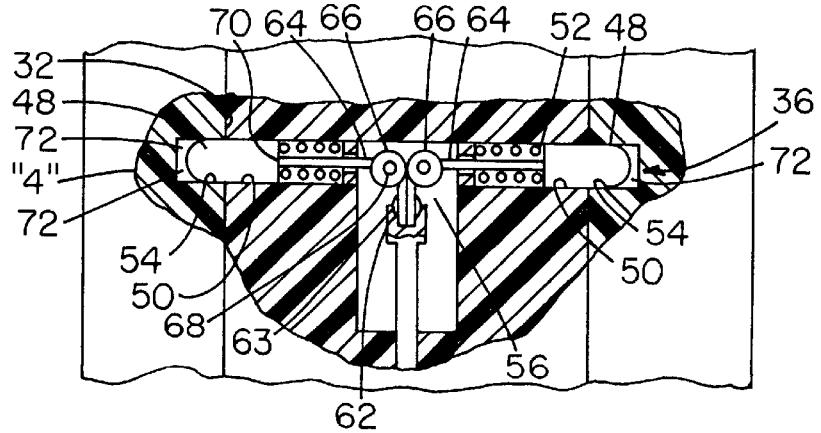

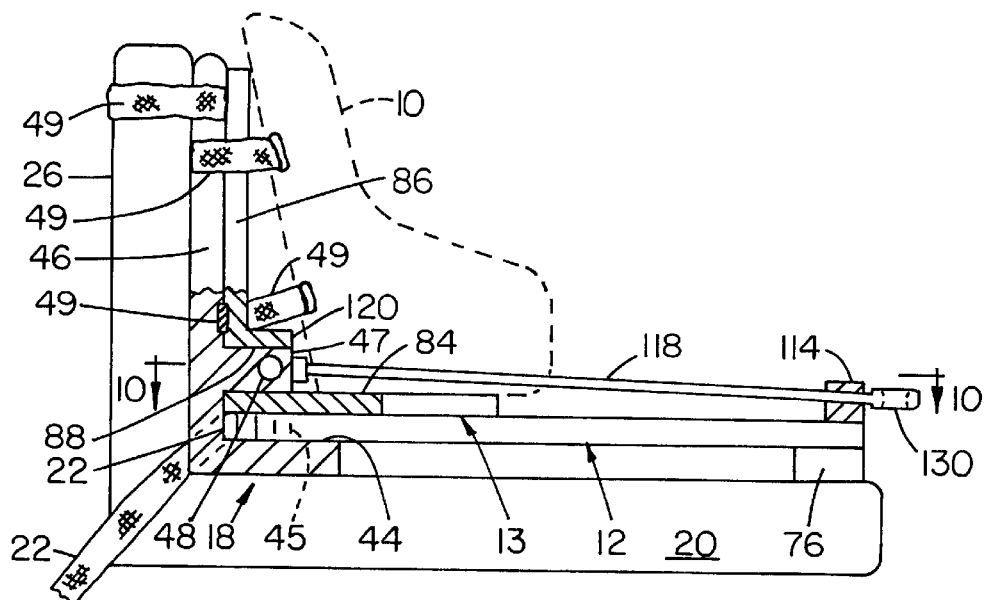
Fig. 11
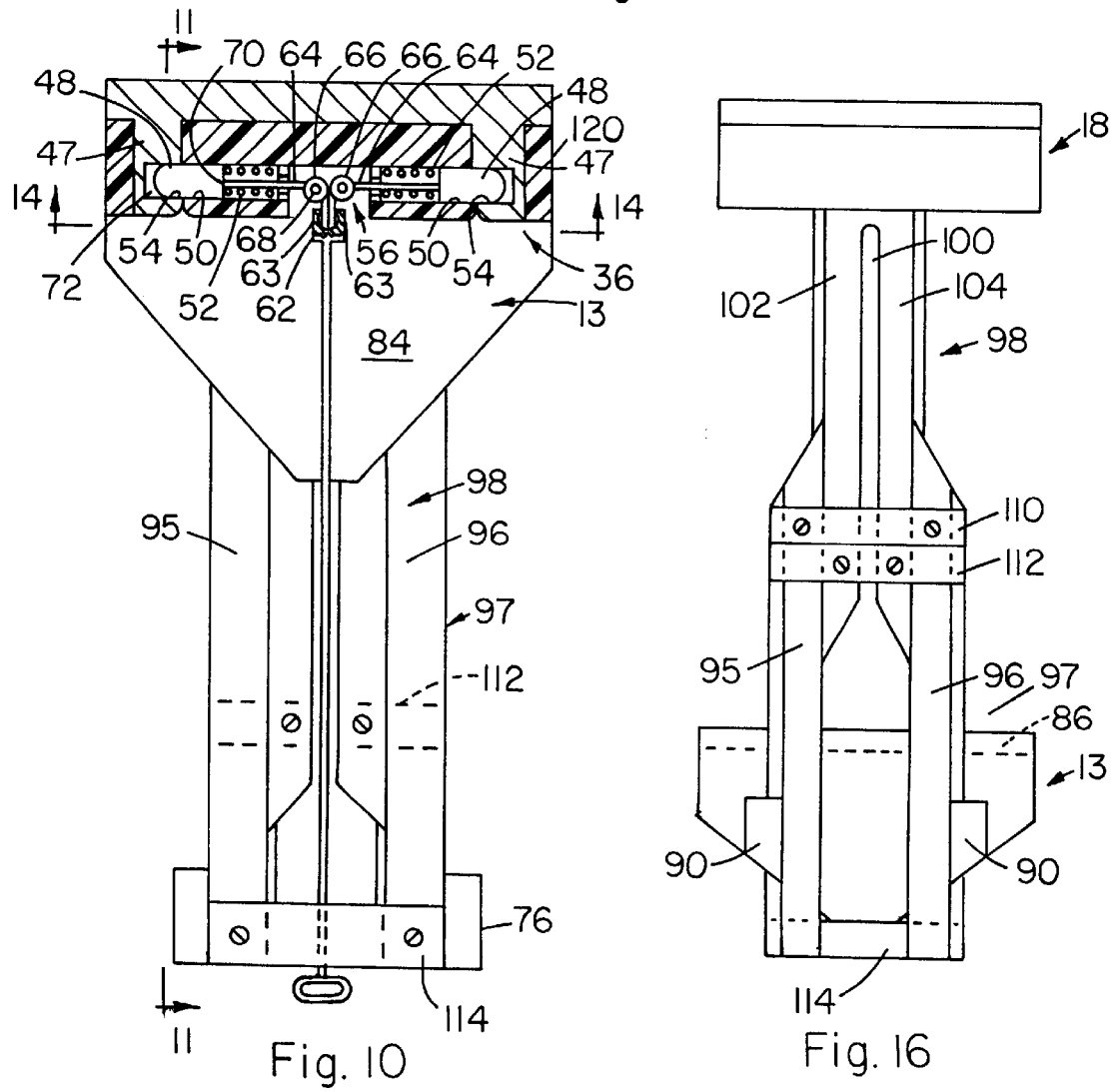
Fig. 10
Fig. 16

US 6,505,887 B2

INFANT'S RESTRAINING SEAT

This application is a continuation-in-part of applicant's Ser. No. 09/437,024 of same title, filed Nov. 9, 1999 and now U.S. Pat. No. 6,158,807.

BACKGROUND OF THE INVENTION

1. Field

This invention concerns unique construction for an infant's restraining seat for use in vehicles such as automobiles or trucks, wherein the restraining seat can be positioned on a seat of the vehicle and anchored by a seat belt or the like to a stable portion of the vehicle such as the vehicle floor. The invention finds special utility for two door automobiles wherein the restraining seat, while still firmly connected to the auto, upon release of a releasable catch mechanism, can be moved forwardly on the rear seat and pivoted toward the auto door opening such that the infant can be easily and safely removed from or placed into the restraining seat without causing physical distress to a person's back or shoulders or the like.

2. Prior Art

Heretofore various mechanisms have been proposed for either swiveling or reclining a restraining seat for enhancing comfort or safety of the infant. Such prior devices as shown in U.S. Pat. Nos.: 4,746,478; 5,183,312; 5,277,472; 4,915,446; 4,971,392; and 5,664,830, the disclosures of which are hereby incorporated herein by reference in their entireties. No prior mechanisms are known to applicant however for actually moving the restraining seat forward in the vehicle, particularly with a pivot function which can be locked or released, as desired, on for example, the rear set of a two-door automobile, without disconnecting the restraining seat from the vehicle.

BRIEF SUMMARY OF THE INVENTION

A unique construction for an infant's restraining seat for use in a vehicle, said construction providing platform means adapted to be secured in a stable position on a vehicle seat, elongated slide guide means having a rearward end and a forward end and a longitudinal slide axis and being laterally pivotally mounted at its said rearward end on said platform means, slide means adapted to support an infant's cushioned seat and being slidably mounted on said guide means for axial movement thereon, and position locking means for said slide means whereby said slide means and cushioned seat mounted thereon can be locked in a non-pivotal and rearward travel position adjacent the back of a vehicle seat and then unlocked and moved axially on said guide means and pivoted laterally to a forward position on said vehicle seat whereby, thru pivoting of said guide means and cushioned seat can be aligned with and positioned adjacent a door opening of said vehicle for providing easy and safe access to said cushioned seat by a person standing substantially outside and vehicle.

In certain preferred or alternative embodiments:
(a) the slide means has a primary slide and guide structure and at least one extension guide structure;
(b) the base means comprises a seat portion and back portion structure to which a conventional infant's restraining cushioned seat can be removably attached; and
(c) the guide means is pivotally mounted to platform means which is adapted to be firmly connected to a rigid stationary portion of the vehicle, wherein releasable locking means is provided to firmly, non-pivotally, but releasably anchor the slide means to the platform means when the slide means and restraining cushioned seat is in its travel position against the auto seat back; and
(d) a twist type of release mechanism is provided for releasing said locking means from a remote location.

BRIEF DESCRIPTION OF THE DRAWINGS

The invention will be further understood from the drawings and description, wherein the various components are not to scale and some are enlarged for clarity:

FIG. 1 is a side view, partially in longitudinal cross-section, of on preferred embodiment of the present invention;

FIG. 2 is a cross-sectional view taken along line 2—2 of FIG. 1 in the direction of the arrows;

FIG. 3 is a top view of the base means taken along line 3—3 of FIG. 2 in the direction of the arrows with portions broken away for clarity;

FIG. 4 is a cross-sectional view of dotted area "4" of FIG. 3 showing the locator pins in a locked position and a retracting pull mechanism therefor;

FIG. 5 shows a variation of the slide of FIGS. 2 and 3 wherein rollers are substituted for the stabilizer fins or second shoulder means shown in FIGS. 2 and 3;

FIG. 6 is a cross-sectional view taken along line 6—6 of FIG. 5 in direction of the arrows;

FIG. 10 is a top view of the base means with portions thereof shown in cross-sections as taken along line 10—10 of FIG. 11 and showing one embodiment of the locking means in detail;

FIG. 11 is a cross-sectional view taken along line 11—11 of FIG. 10 with the infant's retraining seat shown in dotted outline;

FIG. 16 is a bottom view, without the slide pad, of the completely extended slide guides with the slide or seat support in a forward stopped position;

DETAILED DESCRIPTION OF THE DRAWINGS

Figure 7:
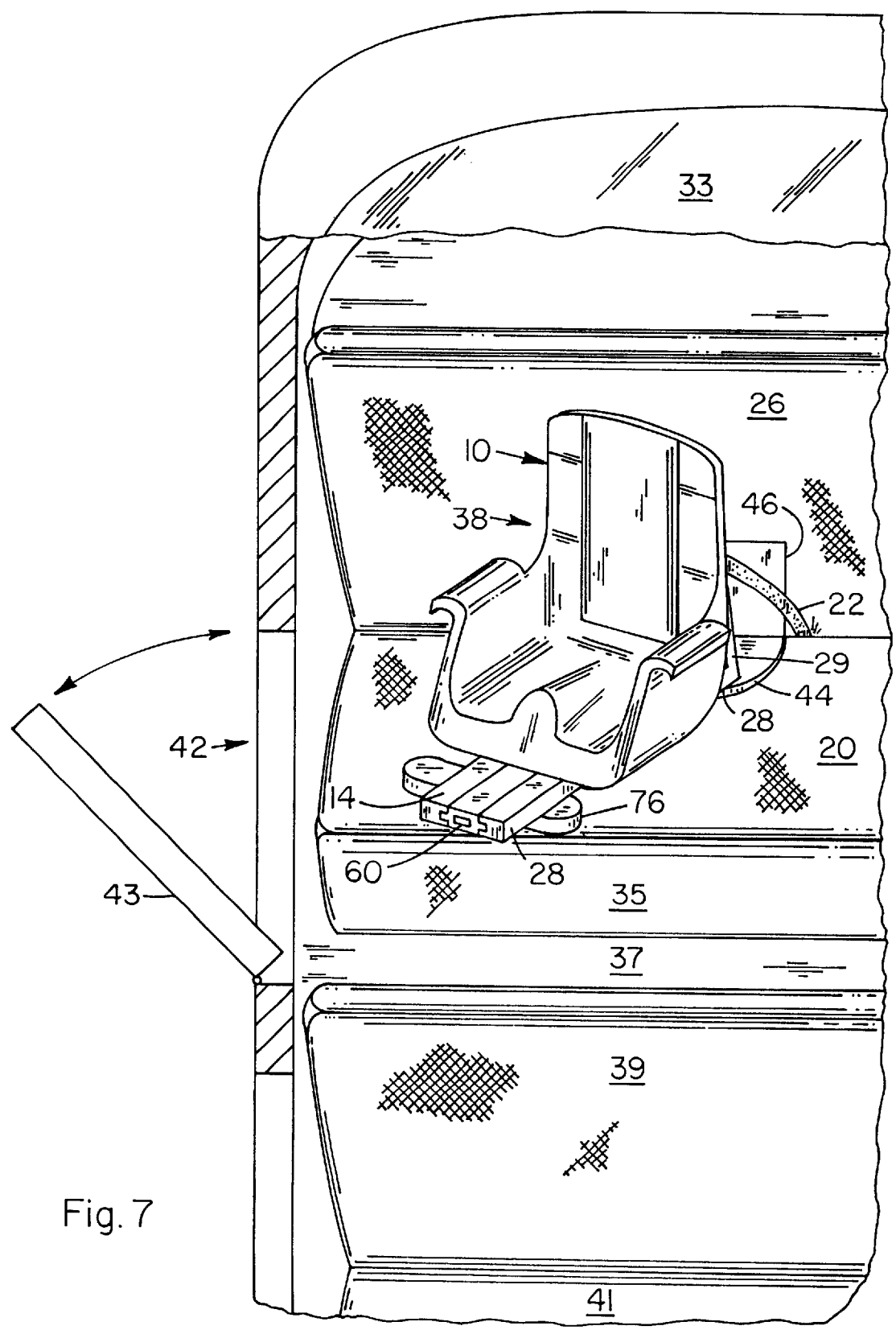
FIG. 7 is an isometric view of an embodiment of the present invention showing the restraining seat in a forward position on a vehicle rear seat.
Figure 9:
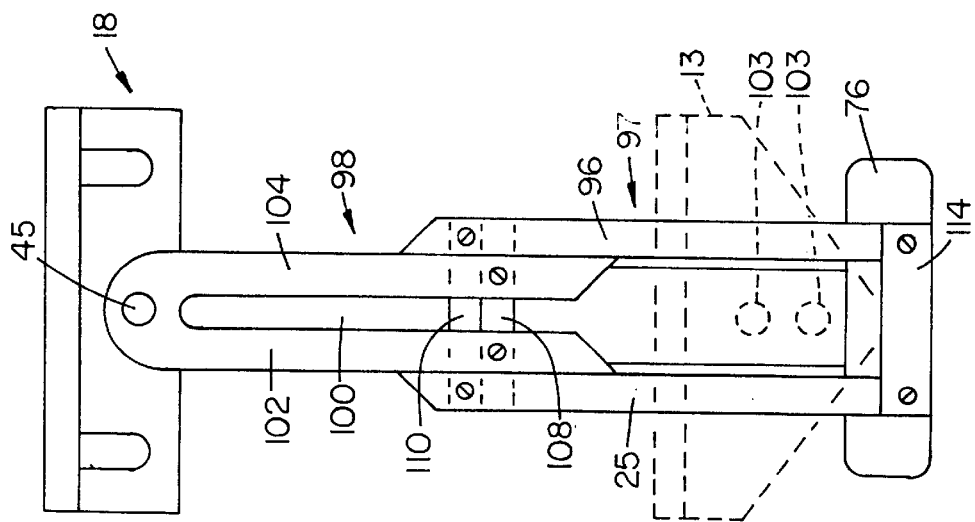
FIG. 9 is a view as in FIG. 8 showing the slide means or seat support and the extension slide in their fully extended forward positions.
Figure 8:
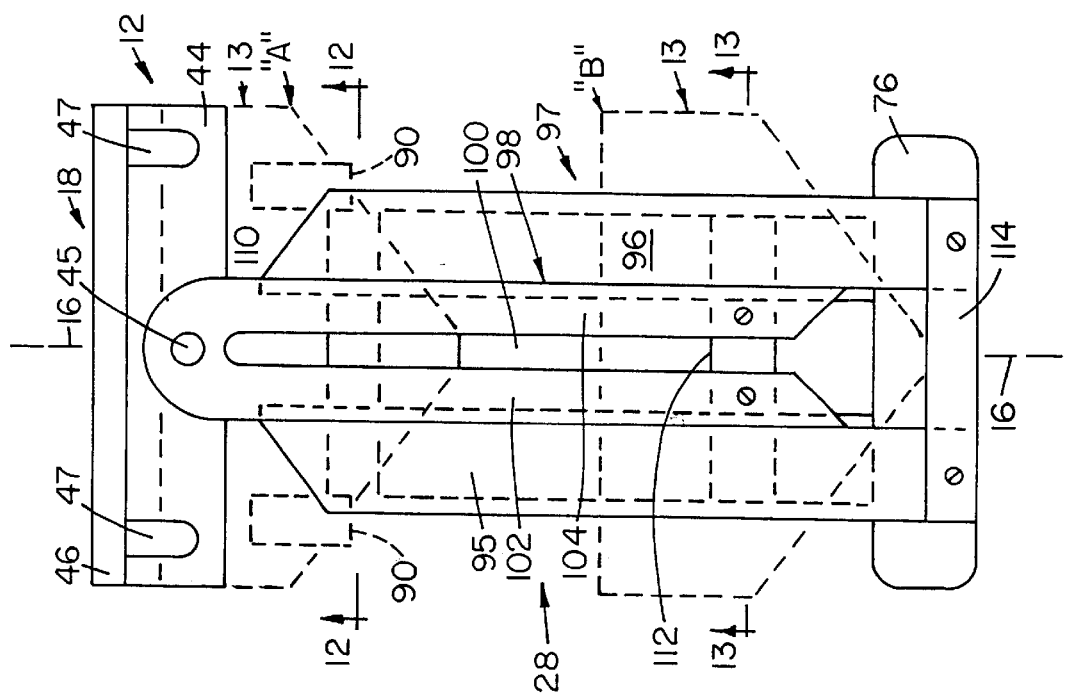
FIG. 8 is a top view of a double slide and guide variation of base means showing a portion of a seat support locking means, with the seat support shown in dotted outline in its rearward or travel position designated "A" and also in a forward or loading position designated "B".
Figure 12:
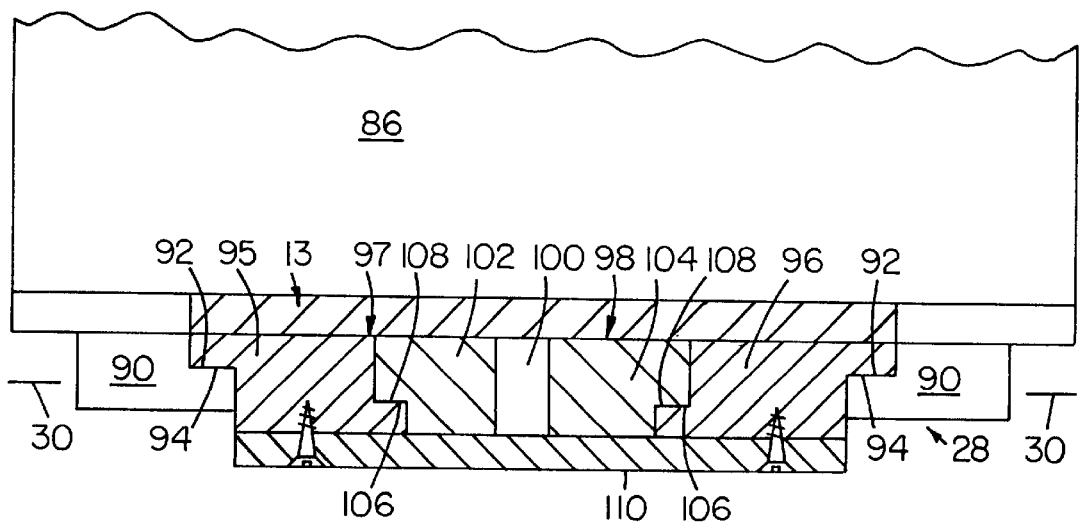
FIG. 12 is a cross-sectional view taken along line 12—12 of FIG. 8.

The invention, in certain preferred embodiments, will be further understood from the following description with particular reference to FIGS. 1–7 wherein the restraining seat 10 of conventional cushion material is adapted to be affixed to a base means generally designated 12 and comprising slide means 14 having a longitudinal axis 16, platform means 18 being adapted to rest on a vehicle seat 20, securement means 22 on said platform means adapted to attach said platform means to a stationary section such as floor 24 of said vehicle whereby said platform means can be substantially stabilized in position on said vehicle seat adjacent the back 26 thereof, slide guide means 28 also having said longitudinal axis 16 and a lateral plane 30 and being pivotally connected to said platform means for pivoting on said platform means substantially in said lateral plane, longitudinally extending first shoulder means 32 on said guide means, longitudinally extending second shoulder means 34 on said slide means and interlocking with said first shoulder means to allow relative longitudinal motion but not significant vertical motion therebetween, and cooperating releasable locking means generally designated 36 on said slide means and said guide means whereby said slide means can be moved longitudinally of said guide means between a rearward position generally designated 38 adjacent the back 26 of said vehicle seat and at least one forward position such as 40 on said vehicle seat, and whereby thru pivoting of said guide means on said platform means said restraining seat can be aligned with and positioned adjacent an opening 42 of a door 43 said vehicle for easy and safe access to said restraining seat by a person standing substantially outside said vehicle. The automobile shown in FIG. 7 has a rear window 33, rear set front section 35, floor section 37, front seat 41 and seat back 39.

The slide means 14 preferably has the configuration shown in FIGS. 1, 2 and 3 wherein the fins 34 of slide block 15 are readily slidable in slots 32 in the guide 28. The fins and slots are interchangeable on the guide and slide block and other configurations of such shoulders may be employed. The back 29 of slide means 14 is preferably removably affixed to seat 10 by seat belt 31 in addition to locking means 36 for additional safety and such that seat 10, i.e., the bottom 11 thereof, can be removably affixed to slide block 15 by screws or the like. This feature allows the seat to be completely removed from base means 12 and used in conventional manner when desired.

The platform means 18 preferably has a bottom section 44 pivotally connected by pivot pin 45 to an upper section 46 provided with a seat belt 22 or other releasable securement device which firmly secures the platform means to a rigid section of the vehicle such as a portion of floor 24 behind and below the vehicle seat back 21.

Locking means 36, in the preferred embodiment shown comprises positioned pins 48 slidably mounted in bores 50 in slide block 15 and urged outwardly by compression springs 52. Recesses 54 longitudinally spaced at any desired interval in guide 28 are adapted to receive these pins as the slide is moved longitudinally in the guide and the pin retractor means generally designated 56 described below has been released.

Retractor means 56 preferably comprises a fairly rigid pull rod 58 such as 3/16" steel rod slidably mounted in bore 59 in block 15 and having a pull ring or the like 60 on its outer end. The inner end 62 of rod 58 is affixed by, e.g., brazing 63, to a pair of flexible cables or wires or the like 64, each of which is mounted on a pulley wheel 66 rotatable on axle 68, and connected at its mounted end 70 by brazing or the like to a positioning pin 48. When the retractor means is not actuated, cables 64 are held taught around the pulley wheels by way of the bore clearances 72, the constant force of springs 52, and the rod stop provided by the outer end 74 of block 15 and ring 60.

In order to allow easy lateral pivoting of guide 28 on a car seat, one or more slide pads such as 76 may be affixed to the bottom of guide 28 and provided with a slippery surface such as silicone resin such as to slide easily on plastic, synthetic or natural fiber, or leather.

In the variation of the slide block 15 shown in FIGS. 5 and 6, the second shoulder means or fins 34 are provided by rollers 78, preferably at least two rotatably mounted on the slide block by axles 80 at any desired longitudinally spaced positions. These rollers and slots 32 are dimensioned such as to provide sufficient clearance therebetween to allow the rollers to both rotate and slide within the slots depending on which portions of the rollers is making the most frictional contact with the slots.

The invention, in certain other preferred embodiments, will be further understood from the following description with particular reference to FIGS. 8–18 and the claims hereof, wherein the structures which are identical to or near identical to the structures and their functions shown in FIGS. 1–7 are numbered the same. The restraining seat 10 of conventional cushion material is adapted to be affixed to a base means generally designated 12 and having the structure comprising slide means 13 having a longitudinal axis 16, platform means 18 being adapted to rest on a vehicle seat 20, securement means 22 on said platform means adapted to attach said platform means to a stationary section such as floor 24 of said vehicle whereby said platform means can be substantially stabilized in position on said vehicle seat adjacent the back 26 thereof, slide guide means generally designated 28 also having said longitudinal axis 16 and a lateral plane 30 and being pivotally connected to said platform means for pivoting on said platform means substantially in or parallel to said lateral plane, longitudinally extending first shoulder means 94 on said guide means, longitudinally extending second shoulder means 92 on said slide means and interlocking with said first shoulder means to allow relative longitudinal motion but not significant vertical motion therebetween, and cooperating releasable locking means generally designated 36 on said slide means and said guide means whereby said slide means can be moved longitudinally of said guide means between a rearward position generally designated "A" adjacent the back 26 of said vehicle seat and any forward position such as "B" on said vehicle seat, and whereby thru pivoting of said guide means on said platform means on pivot means 45 said restraining seat can be aligned with and positioned adjacent an opening 42 of a door 43 of said vehicle for easy and safe access to said restraining seat by a person standing substantially outside said vehicle.

In FIGS. 8 through 16 and 18, the double slide guide or extension slide variation of the base means comprises the platform structure generally designated 18 having the bottom or floor section 44, upper or back section 46, locking peg means 47, and a securement means 22 which preferably is in the form of a conventional auto seat belt, each segment of which is affixed to a rigid, fixed portion of the vehicle floor 24 by, for example, brackets 23 bolted to the floor. Additional belts such as 49 may be placed in any number and in any location, e.g., over upper portions of back section 46 to further stabilize the platform against the seat back 26. Also, seat 10 itself may be provided with such belts to firmly but releasably affix it to any or all of the structures 88, 46 and 26.

In this embodiment a support or slide means generally designated 13 for the infants restraining cushioned seat 10 is provided and comprises a floor 84 and back 86 provided with apertures 88 for slidably receiving studs 47 fixed onto platform means 18. These studs are preferably square in cross-section but may be round or other shape and are provided with recesses 54 for receiving the positioning or locking pins 48 in the manner described above for FIGS. 3 and 4.

Figure 13:
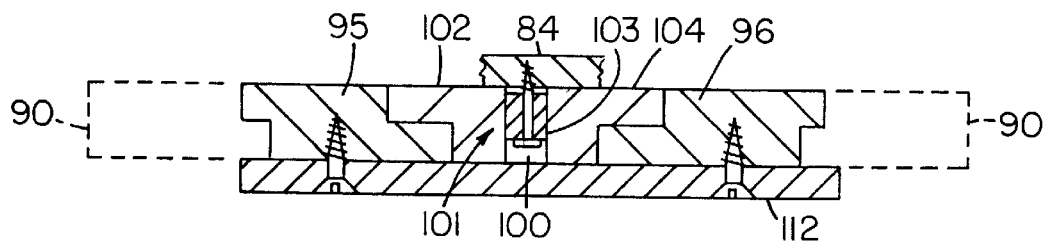
FIG. 13 is a cross-sectional view taken along line 13—13 of FIG. 8.

Support 13 is also the primary slide of this embodiment and is provided with retaining blocks or shoulder means 90 having keying or lap segments 92 which slidably receive equivalent segments 94 on member 95 and 96 of extension slide means 97. The primary side guide 98 for slide 13 and extension slide 97 preferably is provided with an axial slot 100 which forms the two legs 102 and 104. As shown in FIG. 13, this slot slidably receives third shoulder means 101 such as ridge piece or one or more rollers such as 103 affixed to the bottom of the slide floor 84. This shoulder means assists in maintaining axial alignment of the slide means and guide means, particularly in the rearward position thereof. Lap segments 106 on members 102 and 104, and lap segments 108 on members 95 and 96 slide generally axially and longitudinally on each other. It is noted that all of the lap segment pairs are further held in sliding contact by means of tie members 110 and 112.

It is noted that any configuration of keying structure equivalent to the lap segments may be used for the slides, such as tongue and groove or the like. Also, any material can be used for construction of the base means and other structures of the present invention, such as wood, aluminum or structural plastics. It is further noted that where only a single guide means is desired, extension slide 97 may be omitted or integrally fixed to guide 98.

A tie or cross-brace member 110 secured to the underside of the rear portions of members 94 and 96, and an equivalent member 112 secured to the undersides of the front portion of legs 102 and 104 of guide 98 maintain proper spacing of these legs for allowing easy and accurate sliding of seat support slide 13 on guide 98 and for easy and accurate axial sliding of extension slide means 97 on guide 98. A tie or cross-brace member such as pad 76 affixed to the underside of the front portion of members 94 and 96 stabilize these members and also aids in preventing vertical dislocation of guide 98 and slide 97.

It is noted that the abutment of ties 110 and 112 prevents inopportune sliding of 97 off the base means. Another tie member such as 114 secured across the tops of 95 and 96 prevent unplanned sliding of support 13 and seat 10 off of the base means.

Figure 15:
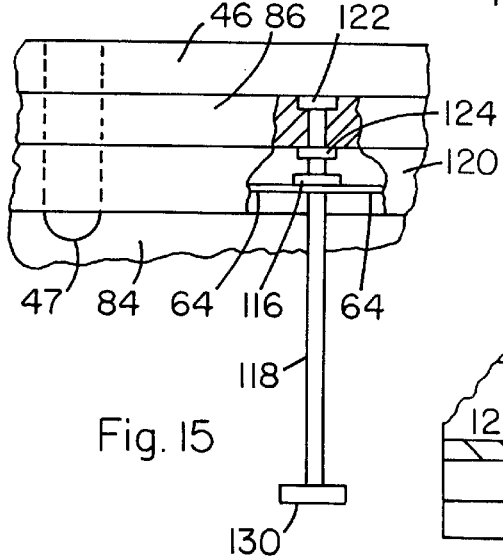
FIG. 15 is a partial view as in FIG. 10 and showing a portion of the locking means structure of FIG. 14.
Figure 14:
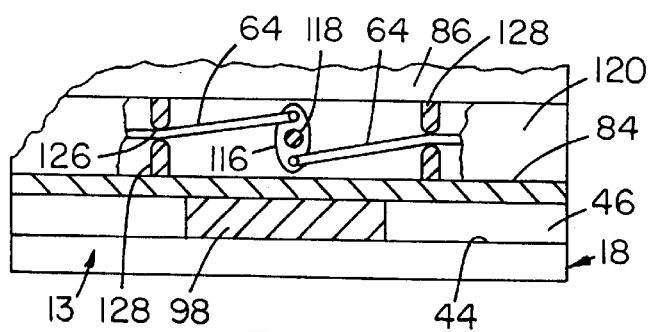
FIG. 14 is a view taken along line 14—14 of FIG. 10 with portions shown in cross-section and showing a variation in the locking means structure.
Figure 17:
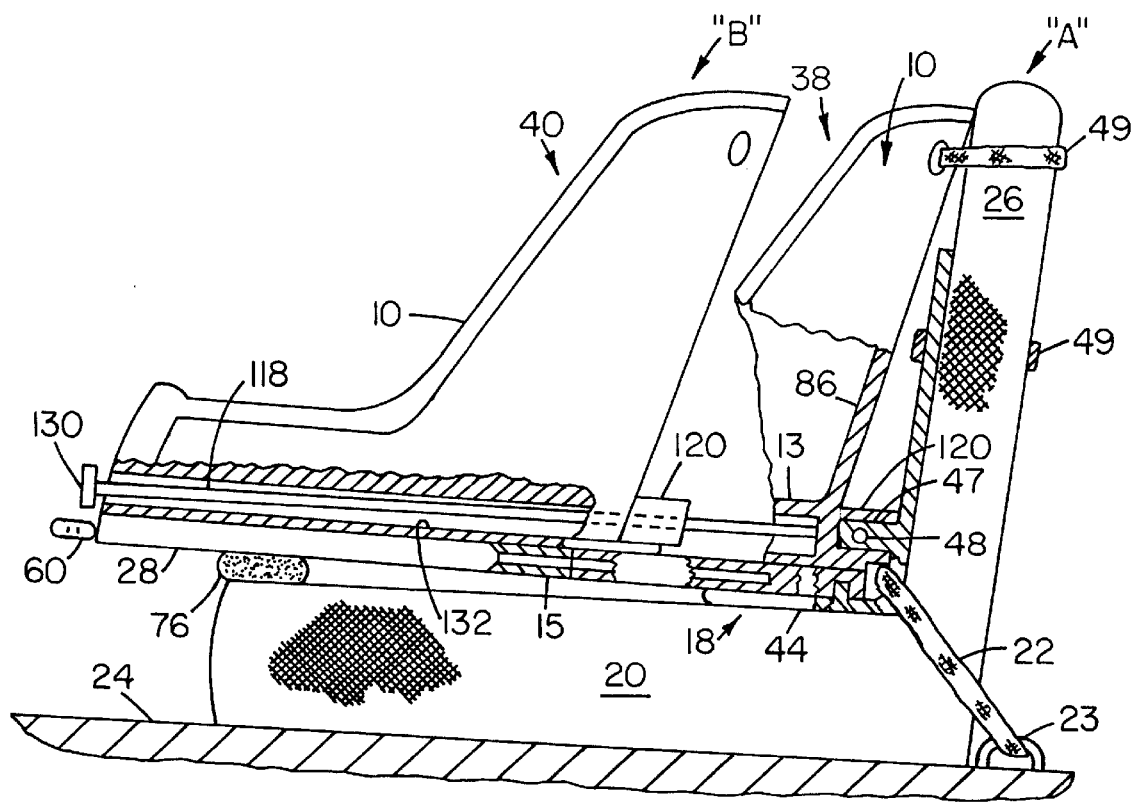
FIG. 17 is a partially sectioned view of a variation of the structure of FIG. 1 showing the cushioned seat as constructed integrally with the slide means and in a forward loading position "B" and a rearward travel position "A" and utilizing the locking structure type of FIGS. 14 and 15.

Referring to FIGS. 14 and 15 one preferred embodiment of the mechanism for releasing the position locking means is shown as a compound crank arm 116 fixed to a shaft 118 which passes into lock body 120 and is rotatably mounted therein and held in axial position by collars 112 and 124 or equivalent means. The pull cables 64 for retracting the pins 48 are connected at opposite ends of arm 116 and are maintained in axial alignment with pins 48 by slidably passing thru the center aperture 126 in grommets 128. Shaft 112, as further shown in FIG. 17, is provided with a twist handle 130 and extends thru suitable passage means 132 provided generally axially in either the seat support 13 or in a bottom portion of the cushioned seat 10. In this embodiment, a simple rotation or twisting of handle 130 in a clockwise direction will retract pins 48 and release the support 13 for forward sliding.

Figure 18:
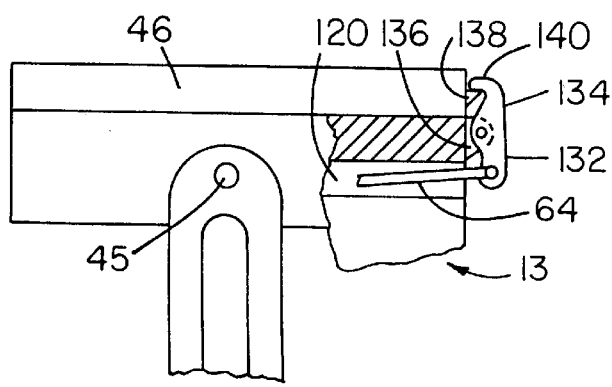
FIG. 18 shows a variation in locking means structure.

Referring to FIG. 18, the cables 64 may, in this embodiment, be connected at their inner ends to any of the release mechanisms described but preferably that of FIGS. 14 and 15. The locking structure of FIG. 18 comprises a pair of latch arms 132 pivotally connected to each side edge 133 and 135 of slide 13 by pivot pins 134 fixed to projections 136 on the slide edge portions. These arms are urged inwardly by spring means such as torsion springs mounted on pins 134 in known manner. Abutments 138 on each side edge of the platform back 46 engage the ends 140 of the latch arms when said ends are cammed over 138 as the support 13 is moved to its full rearward position.

Referring to FIG. 17, in this embodiment the lock body 120 is mounted on the rear of slide back 86 which can be, if desired, an integral part of the cushioned seat 10. In this embodiment, seat 10 can be utilized with any of the slides described herein. As shown in FIG. 17, both of the position locking means of FIGS. 3 and 14 may be used for the same seat at the same time in order to provide multiple position locks for the seat.

The invention has been described in detail with particular reference to preferred embodiments thereof, but it will be understood that variations and modifications will be effected with the spirit and scope of the invention.

I claim:

1. A unique construction for an infant's restraining seat for use in a vehicle, said construction providing platform means adapted to be secured in a stable position on a vehicle seat, elongated slide guide means having a rearward end and a forward end and a longitudinal slide axis and being laterally pivotally mounted as its said rearward end on said platform means, slide means adapted to support an infant's restraining seat and being slidably mounted on said guide means for axial movement thereon, and position locking means for said slide means whereby said slide means can be locked in a non-pivotal and rearward travel position adjacent the back of a vehicle seat and then unlocked and moved axially and pivoted laterally to a forward loading position on said vehicle seat whereby, thru pivoting of said guide means a restraining seat can be aligned with and positioned adjacent a door opening of a vehicle for providing easy and safe access to a restraining seat by a person standing substantially outside said vehicle.

2. The construction of claim 1 wherein a remotely operable lock operating mechanism is provided and extends from said locking means to adjacent the front of said slide means for releasing said locking means for moving said slide means and a cushioned seat mounted thereon to a desired longitudinal and pivoted position on said vehicle seat.

3. The construction of claim 1 wherein longitudinally extending first shoulder means is provided on said guide means, and longitudinally extending second shoulder means is provided on said slide means and interlocking with said first shoulder means to allow relative longitudinal motion but not significant vertical or lateral motion therebetween.

4. The construction of claim 3 wherein a remotely operable lock operating mechanism is provided and extends from said locking means to adjacent the front of said slide means for releasing said locking means for moving said slide means and a cushioned seat to a desired longitudinal and pivoted position on said vehicle seat.

5. The construction of claim 1 wherein said locking means is provided with a release mechanism construction selected from the group consisting essentially of a pull cord device, a twist rod device, or a push rod device.

6. The construction of claim 1 wherein said guide means comprises a first guide section which is directly pivotally mounted on said platform means, and a second guide section which is axially slidable on said first section, and wherein said slide means is slidably mounted on said second guide section to thereby extend the maximum length of axial travel of said slide means.

7. The construction of claim 6 wherein cooperating elements of stop means are provided on said slide means and said guide means for preventing inopportune separation of said slide means from said guide means, or said first and second sections from each other.

8. The construction of claim 1 wherein said slide means and restraining seat are individual constructions wherein attachment means is provided for removably securing said restraining seat to said slide means by automotive type seat belt means.

9. The construction of claim 1 wherein said platform means is adapted to be removably secured to a vehicle by automotive type seat belt means.

10. The construction of claim 1 wherein said locking means comprises positioning pin means generally laterally reciprocatable mounted on said slide means, and pin receiving recess means provided on said platform means.

11. The construction of claim 10 wherein said slide means is formed generally with a seat shape having a back portion which is provided with laterally spaced axially oriented apertures, wherein said platform means is also formed generally with a seat shape having the back portion provided with axially oriented stud means which are laterially spaced to slide thru said apertures when said slide means is axially moved to its rearward position on the vehicle seat, and wherein said recess means are formed generally laterally in said stud means for receiving said pin means.

12. The construction of claim 11 wherein said locking means is provided with a release mechanism construction selected from the group consisting essentially of a pull cord device, a twist rod device, or a push rod device, each said device having an inner end and an outer end, wherein said inner end is connected to said pin means, and said outer end is positioned adjacent an outer end of said guide means, whereby release of said locking means can be performed by hand actuation of the device at a remote and readily accessible location.

13. The construction of claim 1 wherein a restraining seat is mounted on said slide means and said seat and slide means are constructed as a unit.

14. The construction of claim 1 wherein said platform means and slide means each have a floor section and a back section having opposing spaced side edge portions, wherein said edge portions of said back sections are adapted to lie proximate each other when said slide means is positioned in its most rearward position, and wherein said locking means comprises cooperating elements of latch means mounted on said edge portions of said back sections.

15. An infant's restraining seat construction having base means comprising slide means having a longitudinal axis and adapted to support an infant's cushioned seat, platform means being adapted to rest on a vehicle seat, securement means on said platform means adapted to attach said platform means to a stationary section of a vehicle whereby said platform means can be substantially stabilized in position on said vehicle seat adjacent the back thereof, slide guide means also having said longitudinal axis and a lateral pivot plane, said guide means being pivotally connected to said platform means for pivoting on said platform means substantially in said lateral plane, longitudinally extending first shoulder means on said guide means, longitudinally extending second shoulder means on said slide means an interlocking with said first shoulder means to allow relative longitudinal motion but not significant vertical or lateral motion therebetween, and cooperating releasable locking structures on said slide means and said platform means whereby said slide means can be locked in a rearward position adjacent the back of said vehicle seat and, upon release of said locking means, moved forward on said guide means to a forward position on said vehicle seat, and whereby thru pivoting of said guide means on said platform means and slide means and cushioned seat can be aligned with and positioned adjacent a door opening of said vehicle for easy and safe access thereto by a person standing substantially outside said vehicle.

16. The construction of claim 15, wherein a pull or twist mechanism is provided for operating said locking means from a remote location for allowing said slide means to be moved to desired longitudinal position on said guide means and said vehicle seat.

17. The construction of claim 16 wherein said twist mechanism comprises cooperating elements of spring urged positioning pin means and bore means therefor in said slide means and platform means, and rotatable retractor lever means is affixed to said pin means for pulling said pin means out of said bore means to allow said slide means to slide along said guide means.

18. The construction of claim 15 wherein said guide means comprises an elongated member having longitudinally extending slot means therein, and wherein said slide means is provided with third shoulder means for contacting edge portions of said slot means maintaining an axial orientation of said slide means with respect to said guide means.

19. A unique construction for an infant's restraining seat for use in a vehicle, said construction providing a platform structure adapted to be secured in a stable position on a vehicle seat, elongated slide guide structure having a rearward end and a forward end and a longitudinal slide axis and being laterally pivotally mounted at its said rearward end on said platform structure, a slide structure adapted to support an infant's cushioned seat and being slidably mounted on said guide structure for axial movement thereon, and cooperating elements of a position locking structure on said slide structure and platform structure whereby said slide structure and a cushioned seat mounted thereon can be locked in a non-pivotal and rearward position adjacent a back of a vehicle seat and then unlocked and moved axially and pivoted laterally to a forward position on said vehicle seat and whereby thru said pivoting, said cushioned seat can be aligned with and positioned adjacent a door opening of said vehicle for providing easy and safe access to said cushioned seat by a person standing substantially outside said vehicle.

20. The construction of claim 19 wherein a remotely operable lock operating mechanism is provided and extends from said locking structure to adjacent the forward end of said slide structure for releasing said locking structure for moving said slide structure and a cushioned seat mounted thereon to a desired longitudinal and pivoted position on said vehicle seat.

* * * * *